United States Patent

Van Essen

[15] 3,699,538

[45] Oct. 17, 1972

[54] LOGICAL CIRCUIT

[72] Inventor: Hendrik Arie Van Essen, Emmasingel, Eindhoven, Netherlands

[73] Assignee: U.S. Philips Corporation, New York, N.Y.

[22] Filed: Sept. 17, 1970

[21] Appl. No.: 73,156

[30] Foreign Application Priority Data

Sept. 20, 1969 Netherlands..............6914310

[52] U.S. Cl.............................340/173 R, 340/172.5

[51] Int. Cl.............................................G11c 11/36

[58] Field of Search.......................340/174 M, 173 R

[56] References Cited

UNITED STATES PATENTS 3,069,660 12/1962 Wright..................340/174 M

*Primary Examiner*—Terrell W. Fears
*Attorney*—Frank R. Trifari

[57] ABSTRACT

Logical circuit in an envelope having a given number of input terminals, the number of applied input signals exceeding the number of input terminals. Of the input signals applied in order of succession to an input terminal an earlier signal is stored via a gate controlled by a control-signal in a storage element so that this signal in common with a signal applied later to said input terminal becomes available at a group of logical elements of the logical circuit, in which group the signals can be processed simultaneously (FIG. 1).

6 Claims, 12 Drawing Figures

PATENTED OCT 17 1972 3,699,538

4 Sheets-Sheet 1

Figure 1:
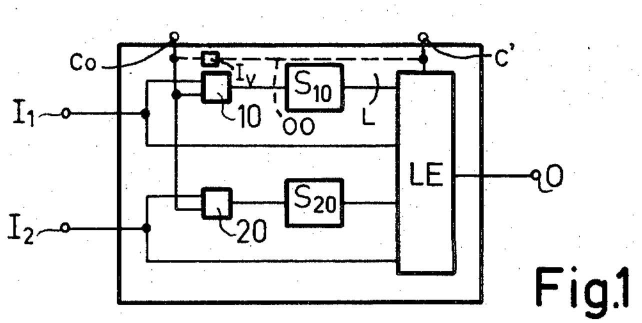

INVENTOR.

HENDRIK A. V. ESSEN

BY

AGENT

PATENTED OCT 17 1972

3,699,538

4 Sheets-Sheet 2

*INVENTOR.*

HENDRIK A. V. ESSEN

*BY*

AGENT

INVENTOR.

HENDRIK A. V. ESSEN

BY

AGENT

INVENTOR.

HENDRIK A. V. ESSEN

BY

AGENT

LOGICAL CIRCUIT

The invention relates to a logical circuit for binary information processing in a module having a given number of input terminals for input signals, at least one terminal for a control-signal and one or more output terminals for output signals, said circuit comprising a logic matrix for performing at least one logical function on the input signals and furthermore at least one storage element to which an input signal can be applied and an output of which is connected to an input of the logic matrix. Such logical circuits are known in many variants. An example thereof is a logical circuit in which a logical operation (for example an AND-function) can be performed, or, for example, a storage function (British Pat. specification No. 1,039,738). Other logical circuits, particularly for carrying out storage functions, are known, in which said function is split up into two parts. In this case in accordance with the input signals coming in a given state is set upon a clock pulse in a first storage element (master element), which state is transferred to a second storage element (slave element), when the clock pulse has disappeared. These are the master-slave structures of, for example, a JK– or DV– flip-flop or combinations thereof.

The first-mentioned logical circuits have a given number of input terminals for input signals, on which the logical operations can be performed in sequence by such a circuit under the control of the controlsignal. If a given logical operation has to be performed on a greater number of input signals in common, the number of input terminals has to be extended by an equal number.

The logical circuits for the aforesaid storage functions have a number of input terminals for input signals equal to the number of input signals to which in common the storage function has to be applied.

The progressive development of integrated circuits gives rise to the following problem, i.e., the implicit restriction of the number of terminals on a module of an integrated circuit. The space at the edges of such a module is small and in order to obtain satisfactory connections the number of terminals on the edges is restricted. In the case of extensions of said logical circuits great problems are involved, while the minimum dimensions of existing circuits are bound to the number of required connecting terminals.

The invention has for its object to solve this problem and the logical circuit according to the invention is characterized in that for processing in common a number of input signals exceeding the number of input terminals of the logical circuit in the group of logical elements a gate controlled by said control-signal precedes in the logical circuit the storage element, by which gate an input terminal of the logical circuit can be connected to the storage element so that input signals appearing sequentially at the same input terminal become available in common via the gate and the storage element and directly respectively at inputs of the logic matrix. It is thus possible to provide by means of a given number of terminals for input signals a greater number of input signals in common at the logic matrix for the simultaneous performance of a logical function. The input terminals are thus utilized several times by consecutive signals. Said storage element stores an input signal applied first to a given input terminal, whereas an input signal applied later to said input terminal is transferred directly to the logic matrix. In the meantime the first input signal is constantly available via the storage element.

Moreover, an input terminal may be connected to a number of gates controlled by the control-signal, by which an input terminal can be consecutively connected via a gate and the storage element and directly by a gate to the logic matrix of.

A further embodiment of the logical circuit according to the invention is characterized in that each input signal can be applied through a gate controlled by the control-signal to a storage element so that under the control of the control-signal an input terminal of the logical circuit can be consecutively connected to the various storage elements, as a result of which input signals appearing sequentially at the same input terminals become available in common via the gates and the storage elements at the inputs of the logic matrix. Thus all input signals coming in in order of succession are stored, which may be advantageous in practice.

In a further logical circuit embodying the invention the storage element itself may be of the master-slave type, in which the logical circuit may furthermore have a clock pulse input or in which the control-signal serves at the same time as a clock pulse. It should furthermore be noted that a control-signal may serve not only for controlling the gates but also for controlling the logic matrix. It will be obvious that many variants of the logical circuit embodying the invention are possible. The invention comprises inter alia explicity embodiments in which a plurality of storage elements serve via gates controlled by a plurality of control-signals for storing a greater number of consecutively arriving input signals at a given input terminal so that still more input signals in common become available at the logic matrix for being simultaneously processed.

The advantage of the use of one or more control-signals in accordance with the invention is particularly conspicuous in those cases in which a plurality of said logical circuits are combined in a single module (medium- or large-scale integration). A control-signal at a control-signal input terminal then serves for all logical circuits in the module in common.

It should be noted that it is of course also possible in this case to provide other control-signals for causing the logic matrix to perform more than one given logical function, as is the case in the above-mentioned known circuit.

The invention will be described more fully hereinafter with reference to a few embodiments.

FIGS. 1 to 7 are block diagrams of logical circuits in accordance with the invention and FIGS. 8 to 12 show in detail embodiments of logical circuits in accordance with the invention.

In the figures corresponding parts are designated by the same references. L designates the logical circuit in a single envelope. LE designates the logic matrix of the logical circuit, by means of which a logical function can be performed. $I_1$, $I_2$, . . . are input signal terminals. O is an output terminal. $C_0$ is a control-signal input terminal, C′ is a further potential control-signal input terminal.

Referring to FIG. 1, the input signal terminal $I_1$ is connected through a gate 10 to a storage element $S_{10}$.

The output of the storage element $S_{10}$ is connected to the logic matrix LE. The input terminal $I_1$ is furthermore directly connected to the matrix LE. In this embodiment the same applies to the input terminal $I_2$: it is connected directly and via a gate 20 and a storage element $S_{20}$ respectively to the matrix LE. The gates 10 and 20 are controllable via the terminal $C_o$ by the control-signal. The operation is as follows: It is supposed that input signals *a* and *b* are available at the respective input terminals $I_1$ and $I_2$ and that the control-signal at the terminal $C_o$ holds the gates 10 and 20 in the open state; then the signals *a* and *b* are stored in the storage elements and are available from that instant for the matrix LE. The signals *a* and *b* are then also directly available to the matrix LE, but this is not essential in this case. When at a later instant signals *c* and *d* arrive at the input terminals $I_1$ and $I_2$ and when the control-signal holds the gates 10 and 20 in the closed state, the signals *c* and *d* are directly available for the matrix LE. The signals *a* and *b* were already available so that now the logic matrix performs its logical function on the common signals *a*, *b*, *c* and *d*. In this way four input signals can be processed by only two input terminals $I_1$ and $I_2$. The group LE may furthermore be controlled via a terminal C′ . For example, a clock pulse may be applied to C′, which causes the matrix LE to perform its function at given instants, for example, only when *a*, *b*, *c* and *d* are present in common. C′ or a still further terminal (not shown) may provide for a control of the matrix LE in a sense such that the matrix LE performs either one function or another. For this purpose a plurality of terminals may be provided, but this will not be dealt with in detail, since it does not form part of the subject-matter of the invention. It should, however, be noted that the matrix LE may also be controlled by the control-signal at the terminal $C_o$ itself. For this purpose a conductor OO, shown in broken lines, is connected in this embodiment to an inverter I*v*. The matrix LE performs its function when no control-signal is available in this case, which means when $I_1$ and $I_2$ are only directly connected to the matrix LE. Signals *c* and *d* at the terminals $I_1$ and $I_2$ are then processed together with the signals *a* and *b* stored previously in the storage elements in the matrix LE.

Figure 12:
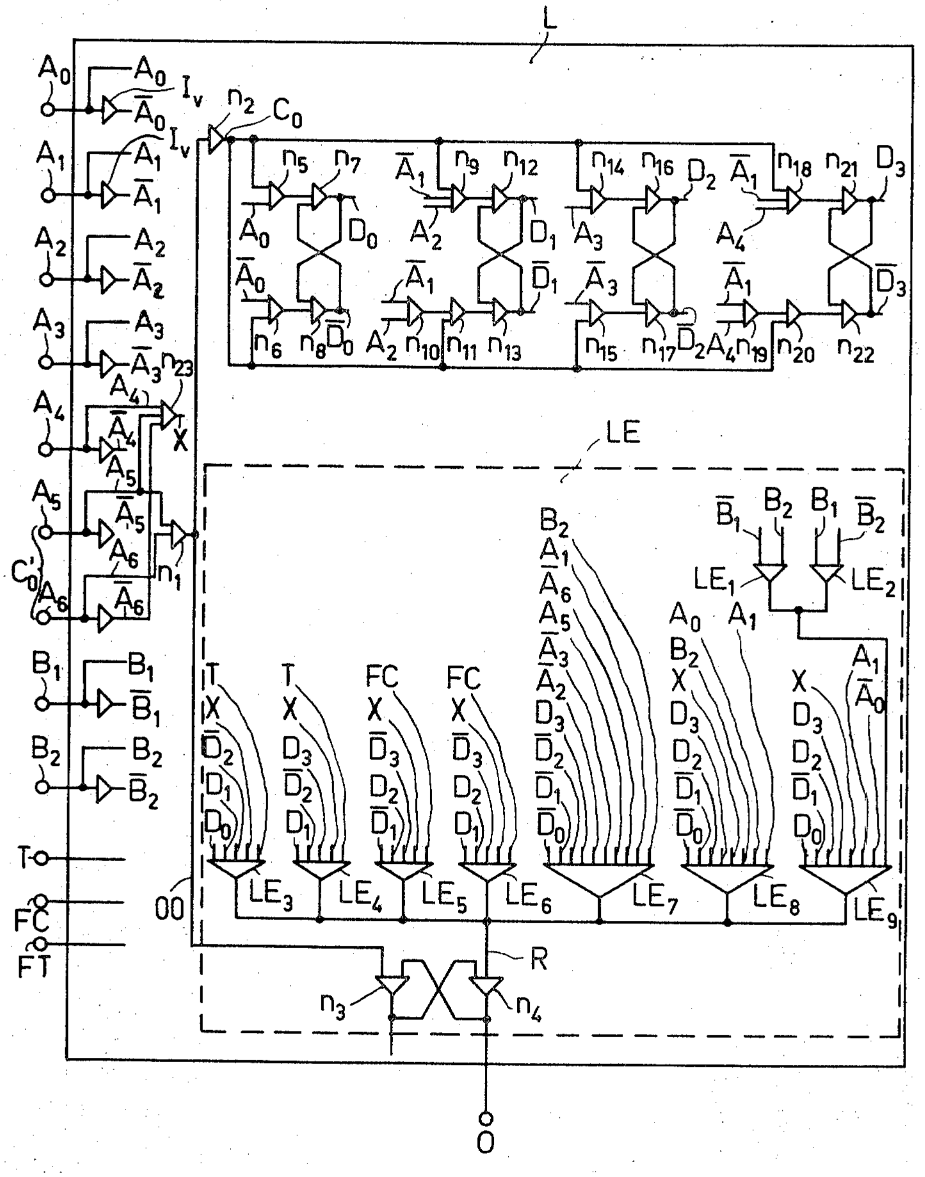

From the example of FIG. 12 it will be obvious that all kinds of combinations of signals, both input signals and signals formed in the logical circuit, may serve as one or more control-signals serving to control the gates preceding storage elements and the logic matrix.

Figure 2:
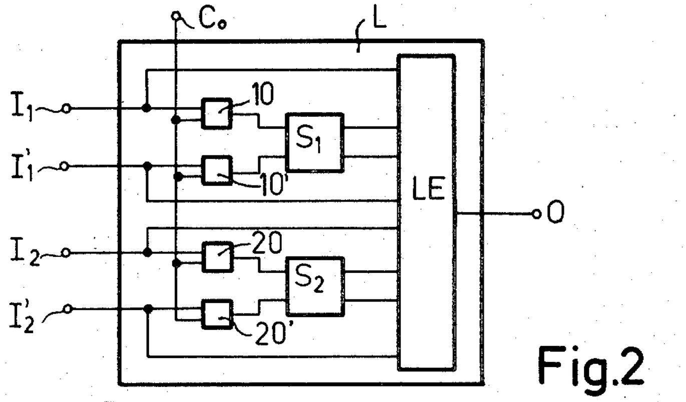

FIG. 2 illustrates how a storage element $S_1(S_2)$ of a logical circuit L may serve in common as input terminals $I_1$ and $I'_1$ ($I_2$ and $I'_2$). Then signals $a, \overline{a}$ and $b, \overline{b}$ and at a later instant, for example, signals $c, \overline{c}$ and $d, \overline{d}$ are available. For the terminals $I'_1$ and $I'_2$ gates 10′ and 20′ respectively are provided, which precede the storage elements $S_1$ and $S_2$ respectively. This common use of a storage element $S_1(S_2)$ is therefore possible when signals with their complements are applied. In practice such a storage element is formed by a cross-wise coupled pair of, for example, NAND- or NOR- circuits (see FIG. 8) or by a flip-flop circuit of the master-slave type (see FIG. 10). When such a type of storage element is employed, the complements will be produced by means of an inverting circuit in those logical circuits to which only the signals without the complements are applied (see FIG. 12).

Figure 3:
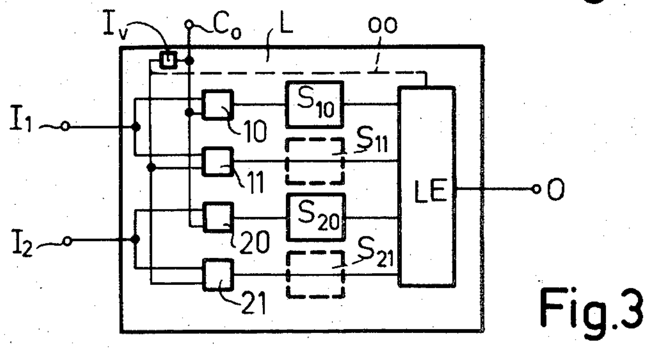

FIG. 3 shows an embodiment in which the input terminals $I_1$ and $I_2$ are connected to gates 10, 11, 20 and 21 controlled by the control-signal at the terminal $C_o$. An inverter I*v* ensures that the first signals *a* and *b* at the terminals $I_1$ and $I_2$ are transferred via open gates 10 and 20 to the storage elements $S_{10}$ and $S_{20}$ and are kept therein, whereas later signals *c* and *d* are applied to the matrix LE via gates 11 and 21 opened by the inverted control-signal (gates 10 and 20 are closed again). The function of LE can then be performed (for example under the excitation of the inverted control-signal across the conductor OO). Not only the gates 10 and 20 may be followed by a storage element, but also the gates 11 and 21 may be followed by storage elements, elements $S_{11}$ and $S_{21}$, indicated by broken lines. It is thus achieved that all sequentially incoming signals are stored in storage elements. In practice this may be desirable for given purposes. For example, the matrix LE may have to perform its function at an instant when the later signals (*c* and *d*) have already disappeared. In this case all signals are still available at said instant for being processed in the matrix LE.

Figure 4:
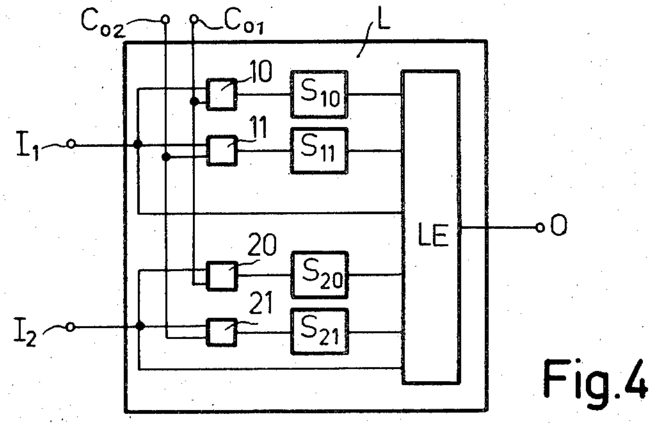

FIG. 4 shows how a plurality (more than two as in the foregoing examples) of consecutive signals can be processed in a logical circuit in accordance with the invention. An input terminal $I_1$ is connected through a gate 10 controlled by a control-signal $C_{01}$, through a storage element $S_{10}$, by a gate 11 controlled by a control-signal $C_{02}$ through a storage element $S_{11}$ and directly to the matrix LE. The same applies to the input terminal $I_2$ with the aid of the gates 20, 21 and the storage elements $S_{20}$ and $S_{21}$. When a control-signal appears at the terminal $C_{01}$, for example, signals *x* and *y* are stored in the respective storage elements $S_{10}$ and $S_{20}$. When a control-signal appears at the terminal $C_{02}$, for example, signals *u*, *v* are stored in the respective storage elements $S_{11}$ and $S_{21}$, whereas later signals *w*, *z* are directly available for the matrix LE. In this way each input terminal is utilized for three consecutive input signals: *x*, *u* and *w* and *y*, *v*, *z* respectively.

Figure 5:
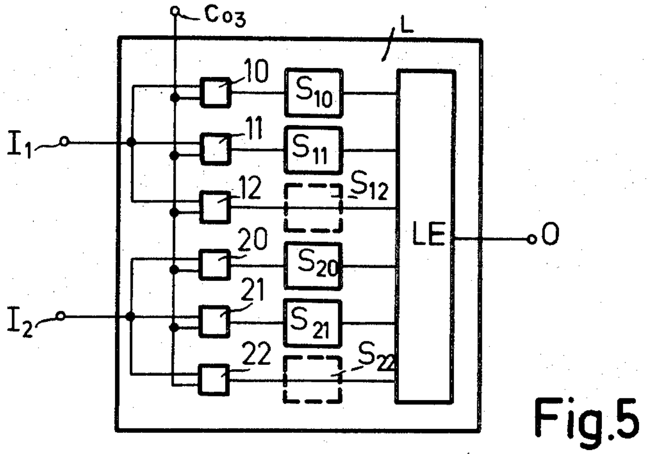

FIG. 5 illustrates that the foregoing (FIG. 4) may be achieved also by a single control-signal $C_{03}$. This control-signal must then have different signal levels by which threshold-voltage gates are controlled. In this embodiment the input terminal $I_1$ is associated with three gates 10, 11 and 12 having different thresholds and the input terminal $I_2$ with three gates 20, 21 and 22 having the same different thresholds as the gates 10, 11 and 12. The input signals appearing sequentially at the terminals $I_1$ and $I_2$ are then processed in the manner described above. It is also possible to store all input signals in a storage element. For this purpose the two storage elements $S_{12}$ and $S_{22}$ are required (shown in broken lines).

Figure 6:
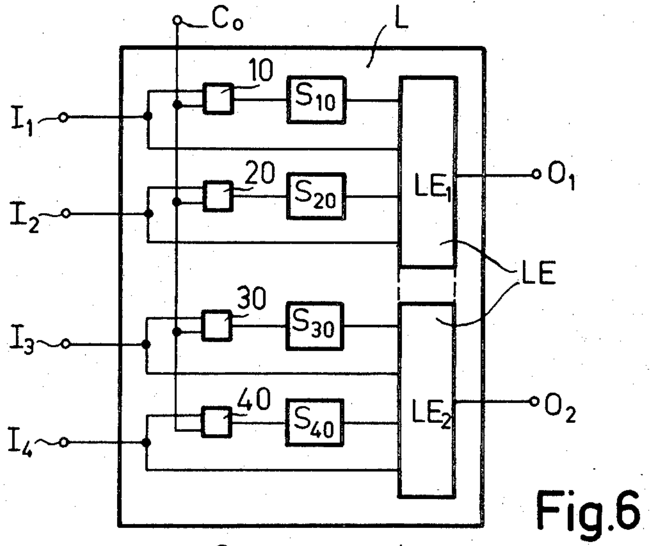

FIG. 6 illustrates that a logical circuit in accordance with the invention, comprising a plurality of input terminals (in this case $I_1$, $I_2$, $I_3$ and $I_4$) and gates 10, 20, 30 and 40 controlled by a control-signal at the terminal $C_o$, need not necessarily comprise invariably a given logic matrix LE and that the number of matrices may exceed unity: for example, $LE_1$ and $LE_2$. These matrices may each have an output $O_1$ and $O_2$ respectively.

Figure 7:
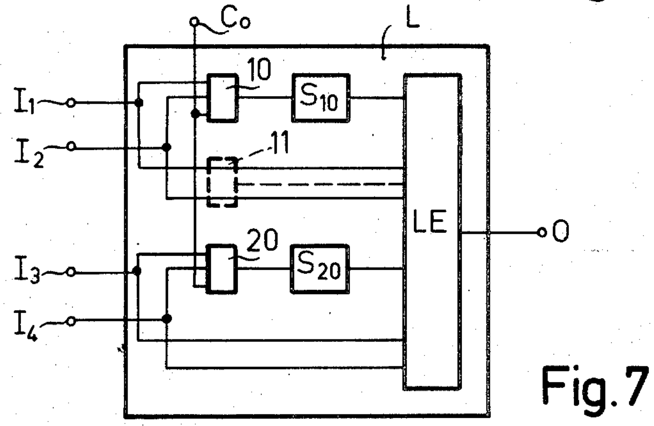

FIG. 7 shows that said gates 10 and 20 may provide combinations of input signals, for example, by an and-function prior to their application to storage elements. In this case input signals at terminals $I_1$ and $I_2$ and input signals at terminals $I_3$ and $I_4$ are combined in the gates 10 and 20 respectively under the control of a control-signal. Such a combination may also be carried out on later signals (see the gate 11 shown in broken lines).

Figure 8:
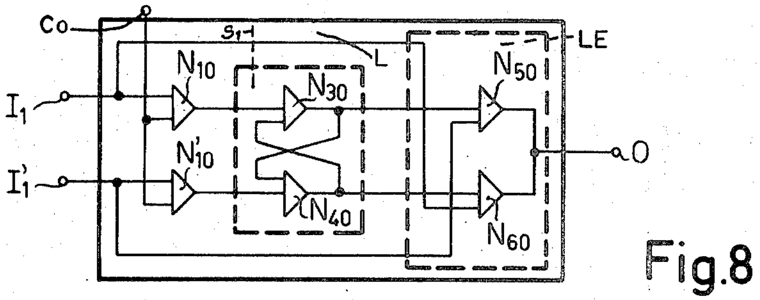

FIG. 8 shows a logical circuit embodying the invention in which a storage element $S_1$ (cf. FIG. 2) is formed by two crosswise coupled nand (or nor-) circuits $N_{30}$ and $N_{40}$. As is shown in FIG. 2 input signals and their complements are used in this case. This embodiment (like the following embodiments of FIGS. 9, 10 and 11) is shown in a simplified form; only the input terminals $I_1$ and $I'_1$ for input signals $a$ and $\overline{a}$ and for later input signals $b$ and $\overline{b}$ are shown. The gates 10 and 10' are in this case also nands ($N_{10}$ and $N'_{10}$). The example of the matrix LE is here an exclusive-or-circuit. The NANDS $N_{50}$ and $N_{60}$ receive the input signals $\overline{a}$ and $b$ and the input signals $a$ and $\overline{b}$. By a wired or-output the function $a\overline{b}+\overline{a}b$ is obtained at the output terminal.

Figures 9, 10:
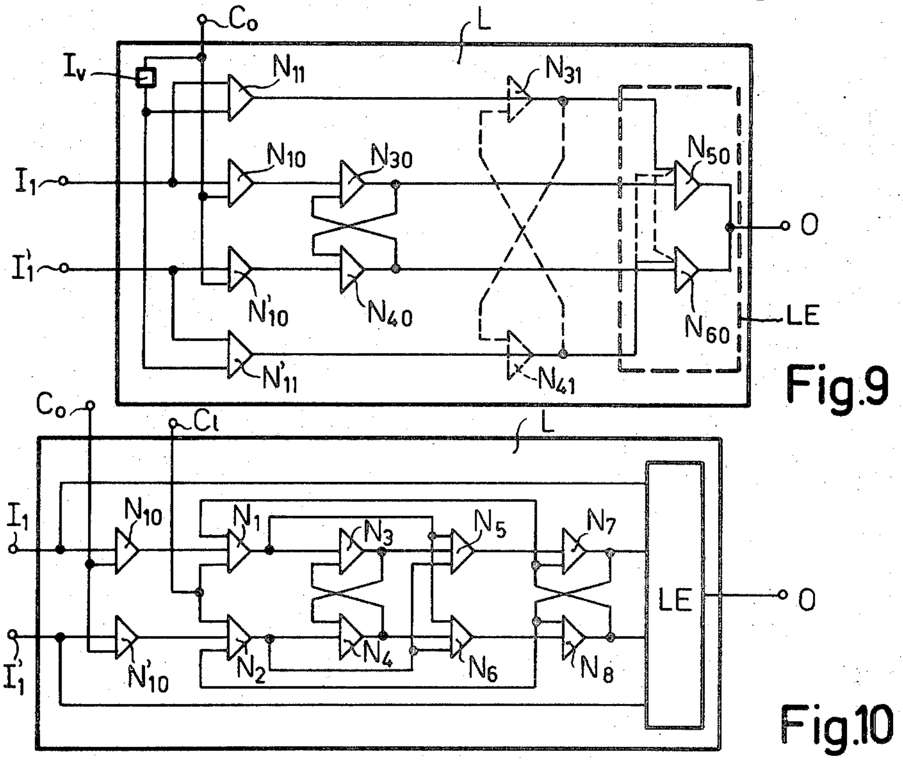

FIG. 9 shows the same embodiment as FIG. 8 but herein the later input signals ($b$ and $\overline{b}$) at the terminals $I_1$ and $I'_1$ are also applied via NANDS $N_{11}$ and $N'_{11}$ controlled by the complement of the control-signal at terminal $C_o$ to the matrix LE (here also an exclusive-or-circuit) (cf. the design of FIG. 3). Storage of these later input signals $b$ and $\overline{b}$ in a storage element formed by crosswise coupled nands is also possible in this case and indicated by broken lines (NANDS $N_{31}$ and $N_{41}$), the connections to nands $N_{50}$ and $N_{60}$ shown in broken lines being then adapted.

FIG. 10 illustrates the same as FIG. 8, but the storage element is now formed by a flip-flop circuit of the master-slave type controlled by a clock pulse at a clock-pulse terminal $C_1$. This circuit is herein a JK flip-flop formed by 8 NANDS $N_1$ to $N_8$. Other forms of storage elements are also possible.

Figure 11:
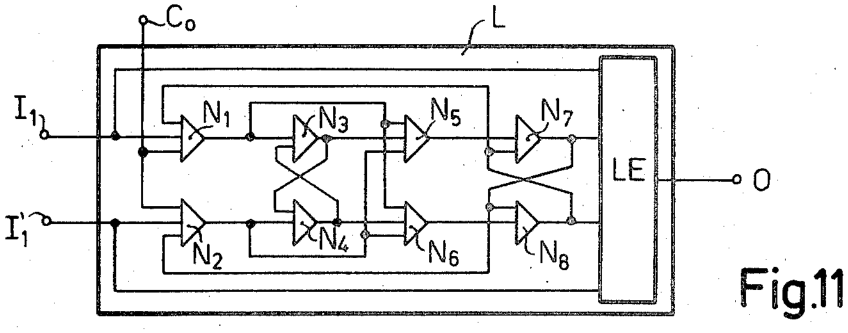

FIG. 11 shows that the common clock-pulse input and control-input $C_o$ is possible. Then the NANDS $N_{10}$ and $N'_{10}$ of FIG. 10 are dispensed with and the control-signal serves in addition as a clock pulse.

Elaborate circuits comprising these kinds of storage elements embodied as illustrated in the preceding Figures are possible without the need for further means.

FIG. 12 illustrates an example of a large-scale integrated logical circuit in accordance with the invention. Various aspects referred to above are carried into effect. Input signals are available at input terminals $A_o$, $A_1$, . . . $A_6$ , $B_1$, $B_2$, T, FC and FT. The control-signal $C_o$ is obtained by combining input signals $A_5$ and $A_6$ in a NAND $n_1$, after which in a NAND $n_2$ the complement is formed. Input terminals $A_5$ and $A_6$ thus serve in addition as control-signal input terminals (indicated by $C'_o$). After NAND $n_1$ this combination $A_5$ $A_6$ provides the control-signal for the group LE. $A_5$ $A_6$ forms the input signal of NAND $n_3$, which forms part of a storage element serving as an output circuit of the group LE and formed by crosswise coupled nands $n_3$ and $n_4$. From FIG. 12 it is further more apparent that in the presence of the control-signal $C_o$ after NAND $n_2$ the input signals $A_o$ and $\overline{A}_o$ are applied via nands $n_5$ and $n_6$ controlled by $C_o$ to a storage element $n_7$, $n_8$. These signals are then available as the signals $D_o$ and $\overline{D}_o$ for the matrix LE. The same applies to signals $\overline{A}_1$ and $A_2$, which become available, after combination in NANDS $n_9$, $n_{10}$ and $n_{11}$ under the control of $C_o$ in the NANDS $n_9$ and $n_{11}$ after the storage element $n_{12}$, $n_{13}$ as signals $D_1$ and $\overline{D}_1$. The same applies to the signals $A_3$, $\overline{A}_3$ via NANDS $n_{14}$, $n_{15}$ controlled by $C_o$ after the storage elements $n_{16}$, $n_{17}$, indicated by the signals $D_2$ and $\overline{D}_2$. Finally the same applies to the signals $\overline{A}_1$ and $A_4$ through NANDS $n_{18}$, $n_{19}$ and $n_{20}$ controlled by $C_o$ in the NANDS $n_{18}$ and $n_{20}$ after the storage elements $n_{21}$, $n_{22}$, indicated as signals $D_3$ and $\overline{D}_3$.

In the absence of the signal $C_o$ after NAND $n_2$ a signal appears across the conductor OO for controlling the group LE, in this case particularly the output circuit of the LE. In this LE the signals $A_1$ ($i=0, \ldots$ ) and $\overline{A}_1$, representing the later signals at the input terminals $A_o$, . . . $A_6$, together with the signals $D_o$, $\overline{D}_o$, $D_1$, $\overline{D}_1$, $D_2$, $\overline{D}_2$ and $D_3$, $\overline{D}_3$ and with further signals at input terminals $B_1$, $B_2$ T, FC and FT and together with a signal X formed in the logical circuit in the NAND 23 are combined in the NANDS $LE_1$, $LE_2$, $LE_3$, . . . $LE_9$ and applied via a wired OR-connection as a signal R to the NAND $n_4$. The result of said combination is then formed by the output signal at the terminal O. In this embodiment seven input terminals ($A_o$ . . . $A_6$) are thus employed twice, which means an economy of seven terminals.

The embodiment of FIG. 12 is an example of a test circuit carrying out a test on a group of input signals i.e., the later input signals $A_1$ . . . $A_6$ and the other signals $B_1$, $B_2$, T, FC and FT. The earlier input signals $A_1$ . . . $A_6$ provide the adjustment of the test circuit in a sense such that the earlier input signals $A_1$ . . . $A_6$ serve as conditioning signals $D_o$, $\overline{D}_o$, . . . $D_3$, $D_3$ for the various NANDS of the group LE, stored in the storage elements. When the later signals are applied, they are processed in the pre-conditioned group of logical elements.

In the above embodiment and in many other imaginable embodiments of such logical circuits said earlier signals may be considered to form instruction codes by which the logical circuit has a predetermined setting. Said later signals are then the signals processed in the logical circuit configuration set by said instruction codes. Said earlier and said later input signals may in practice originate from the various parts of a computer. The earlier signals may be instruction codes from a programm store and the later signals may be data signals from a data store to be processed.

What is claimed is:

1. A logic circuit module for processing at least two serially transmitted groups of $n$ signals, comprising a terminal on the module for receiving control signals, $n$ terminals for receiving the groups of binary information signals, at least $n$ gates each having an input connected to the control signal terminal and each having a further input connected to a different one of the $n$ binary information input terminals, a separate storage device connected to an output of each gate for storing a binary information signal passed through the associated gate in response to a control signal on the control signal terminal, a logic matrix, means for connecting an output of each storage element to a separate input of the logic matrix, and a separate means for connecting each information signal input terminal to a separate input of the logic matrix, whereby two groups of $n$ information signals received on $n$ input terminals of the module maybe processed within the module by a logic matrix having at least two $n$ input terminals.

2. A logic circuit as claimed in claim 1, wherein the separate means for connecting each information signal input terminal to a separate input of the logic matrix comprises *n* auxiliary gates each having an input connected to a separate information input terminal of the module and having a further input connected to the control signal terminal of the module, and means for inverting the control signals to the auxiliary gates whereby the auxiliary gates and the first gates are inversely controlled by the signals on the control terminal of the module.

3. A circuit as claimed in claim 2, further comprising an auxiliary group of storage elements each connected between an output of an auxiliary gate and an input of the logic matrix.

4. A logic circuit as claimed in claim 1 wherein the storage element comprises a master-slave flip-flop, and wherein the logic circuit further comprises a clock-pulse input terminal on the module connected to the master-slave flip-flop.

5. A logic circuit as claimed in claim 1, wherein the storage element is a master-slave flip-flop having a clock-pulse input terminal, and further comprising means for connecting the clock-pulse input terminal of the master-slave flip-flop to the control-signal input terminal of the module.

6. A circuit module as claimed in claim 1, further comprising means for connecting the control terminal of the module to the logic matrix, and wherein the logic matrix is responsive to signals on the control input of the module.

* * * * *